United States Patent [19]

Inoue et al.

[11] Patent Number: 4,649,175

[45] Date of Patent: Mar. 10, 1987

[54] THERMOSETTING ALKYD RESIN COATING COMPOSITION

[75] Inventors: Hiroshi Inoue, Hiratsuka; Yoshio Sasaki, Kanagawa, both of Japan

[73] Assignee: Kansai Paint Company, Limited, Amagasaki, Japan

[21] Appl. No.: 755,762

[22] Filed: Jul. 17, 1985

[30] Foreign Application Priority Data

Jul. 18, 1984 [JP] Japan .................................. 59-148856

[51] Int. Cl.$^4$ ............................................. C08G 63/76
[52] U.S. Cl. .................... 525/38; 525/167.5; 528/288; 528/295.3; 528/295.5
[58] Field of Search ............................ 525/38, 167.5; 528/295.3, 295.5, 288

[56] References Cited

U.S. PATENT DOCUMENTS

| | | | |
|---|---|---|---|
| 4,181,638 | 1/1980 | Lasher | 525/167.5 |
| 4,517,334 | 5/1985 | Wilk et al. | 528/295.5 X |
| 4,540,751 | 9/1985 | Lynch et al. | 528/295.5 X |
| 4,555,564 | 11/1985 | Fischer et al. | 528/295.5 X |

*Primary Examiner*—Lucille M. Phynes
*Attorney, Agent, or Firm*—Armstrong, Nikaido, Marmelstein & Kubovcik

[57] ABSTRACT

The present invention provides a thermosetting alkyd resin coating composition consisting essentially of (A) an alkyd resin or a fatty acid-modified alkyd resin obtained by reacting a polybasic acid component with a polyhydric alcohol component using or without using a fatty acid conjointly with the components and (B) a crosslinking agent, the composition being characterized in that the polyhydric alcohol component comprises an alkanolamine having at least two hydroxyl groups in the molecule.

8 Claims, No Drawings

THERMOSETTING ALKYD RESIN COATING COMPOSITION

The present invention relates to a thermosetting alkyd resin coating composition and more particularly to a thermosetting coating composition comprising a nitrogen-containing alkyd resin.

Thermosetting coating compositions of the alkyd resin are known which consist essentially of a crosslinking agent and an alkyd resin or a fatty acid-modified alkyd resin obtained by reacting a polybasic acid component and a polyhydric alcohol component using or without using a fatty acid conjointly therewith. Such coating compositions are inexpensive and highly amenable to coating operation and are therefore widely used.

With the current rapid advance of technical innovations, higher standards are invariably required of the properties of coating compositions. With alkyd resin coating compositions, it is desired that the pigment be dispersible more effectively with higher stability to give coatings having an improved appearance on finishing in respect of gloss, distinctness-of-image gloss, etc. Further because the coatings of these compositions are generally still unsatisfactory in adhesion, resistance to corrosion and chemicals, flexibility and like properties, it has also been strongly desired to improve these properties.

Published Unexamined Japanese Patent Application No. SHO 59-43066 discloses a coating composition which is improved in one of the foregoing desirable properties, i.e. pigment dispersibility, and which comprises an amphoteric Polyester resin prepared by reacting a basic resin, such as urea resin, or a basic compound, such as monoethanolamine, diethanolamine or aminopentanol, with a saturated alicyclic polybasic acid-modified polyester resin, the amphoteric polyester resin having pendant nitrogen atom on the side chain or at the terminal end. However, this coating composition, which is not sufficiently curable, gives a coating of being poor in adhesion and low in resistance to corrosion and chemicals. Furthermore, the production of the resin component, i.e. amphoteric polyester resin, requires at least two steps, namely, the step of preparing a polyester resin and the step of subsequently reacting a basic resin or compound with the polyester resin. The coating composition therefore has the drawback of necessitating a complicated production process and being costly to produce.

An object of the present invention is to provide a thermosetting alkyd resin coating composition which is outstanding in pigment dispersibility and in dispersion stability of the pigment.

Another object of the invention is to provide a thermosetting alkyd resin coating composition which is excellent in adhesion to an article to be coated.

Another object of the invention is to provide a thermosetting alkyd resin coating composition which has high resistance to corrosion and chemicals and is excellent also in flexibility.

These and other objects of the invention will become apparent from the following description.

In a thermosetting alkyd resin coating composition which consists essentially of (A) an alkyd resin or a fatty acid-modified alkyd resin prepared by reacting a polybasic acid component with a polyhydric alcohol component using or without using a fatty acid conjointly with the components and (B) a crosslinking agent, the present composition is characterized in that said polyhydric alcohol component comprises an alkanolamine having at least two hydroxyl groups in the molecule.

The alkyd resin or a fatty acid-modified alkyd resin (A) in the thermosetting coating composition of the present invention is a nitrogen-containing alkyd resin which has nitrogen atom incorporated into its main skeleton by using an alkanolamine having at least two hydroxyl groups partially or solely as the polyhydric alcohol component to be subjected to an esterification reaction with a polybasic acid component. The thermosetting coating composition of the invention comprising the above nitrogen-containing alkyd resin has excellent adhesion to an article to be coated, for example, to metals with or without surface-treatment with a phosphate or the like and to plastics, especially to polyamide resin, and is therefore applicable directly to such substrates without necessitating a primer or the like. Moreover, the coating of the composition can be further coated directly with the same composition without the necessity of sanding. Additionally, the present composition satisfactorily adheres to primer coats, intercoats and top coats of other compositions and is usable in combination with other compositions for forming a multilayer coating which will not separate between the layers.

Further, the nitrogen-containing alkyd resin to be used in this invention is highly adsorbable by the surface of pigment particles and therefore readily permits dispersion of pigments. For example, fine particles of carbon black can be readily and uniformly dispersed in the present composition although it is an acid pigment which has been frequently difficult to disperse uniformly. The resin also permits stable dispersion of various inorganic pigments as well as organic pigments. Accordingly, the present coating composition can be preserved almost free of any coagulation or precipitation of pigments and forms coatings with high gloss and distinctness-of-image gloss without any reduction even when used after a long period of storage. Moreover, the present coating composition has outstanding curability and improved resistance to corrosion and to chemicals, such as alkalis, acids, solvents, etc. and is excellent also in flexibility. The present coating composition is further advantageous in production cost and procedures because the nitrogen-containing alkyd resin serving as the resin component and having nitrogen atom in the main skeleton can be prepared by a single-step reaction.

The alkyd resin to be used in the present invention is prepared using an alkanolamine having at least two hydroxyl groups as a portion or the whole of the polyhydric alcohol component of the resin, by reacting the polyhydric alcohol component with a polybasic acid component in a single step. Accordingly, the resin contains at least two hydroxyl groups of the alkanolamine as esterified with the polybasic acid component, with the nitrogen atom thereof positioned in the main skeleton of the alkyd resin. The fact that the present coating composition is excellent not only in adhesion and pigment dispersibility but also in curability, etc. is thought attributable especially to the presence of nitrogen atom in the alkyd resin main skeleton.

The nitrogen-containing alkyd resin (A) can be prepared by reacting a polybasic acid component with a polyhydric alcohol component which contains an alkanolamine having at least two hydroxyl groups, further using a fatty acid in combination with the two components when so desired.

The polybasic acid component comprises a polycarboxylic acid compound having at least two carboxyl groups in the molecule. Examples of such compounds are aliphatic saturated dibasic acids such as succinic acid, adipic acid, azelaic acid, sebacic acid, dodecylsuccinic acid and anhydrides thereof, aliphatic unsaturated dibasic acids such as maleic acid, fumaric acid, itaconic acid and anhydrides thereof, aromatic polybasic acids such as phthalic acid, isophthalic acid, terephthalic acid, trimellitic acid, pyromellitic acid and anhydrides thereof, alicyclic polybasic acids such as tetrahydrophthalic acid, methylcyclohexenetricarboxylic acid, hexahydrophthalic acid, endomethylenephthalic acid, hexachloroendomethylenetetrahydrophthalic acid, tetrachlorophthalic acid, cyclohexanedicarboxylic acid, methylhexahydrophthalic acid, hexahydrotrimellitic acid and anhydrides thereof, etc. These compounds are usable singly or in the form of a mixture of at least two of them.

The polyhydric alcohol component to be reacted with the polybasic acid component for preparing the nitrogen-containing alkyd resin comprises an alkanolamine having at least two hydroxyl groups in the molecule, or a mixture of the alkanolamine and a polyhydric alcohol. The alkanolamine is a compound which has in the molecule at least two hydroxyl groups reactive with the carboxyl groups of the polybasic acid component, and at least one functional group, $>N-$, having a nitrogen atom with a lone electron-pair. Examples of such compounds are diethanolamine, triethanolamine, diisopropanolamine, triisopropanolamine, methyldiethanolamine, cyclohexyldiisopropanolamine, methyldiisopropanolamine, etc. These compounds are usable singly, or at least two of them can be used in combination. Among the above examples, diethanolamine and triethanolamine are especially preferable. The polyhydric alcohol which can be used in combination with the alkanolamine is an alcohol having at least two hydroxyl groups in the molecule. Examples of such alcohols are ethylene glycol, diethylene glycol, triethylene glycol, propylene glycol, dipropylene glycol, butanediol, neopentyl glycol, 1,2-, 1,3- 2,3- and 1,4- butylene glycols, pentanediol, 2,3-dimethylpropanediol, 1,6- and 2,5-hexanediols, hydrogenated bisphenol-A, cyclohexanedimethanol, trimethylene glycol, tetramethylene glycol, hexamethylene glycol, trimethylolethane, trimethylolpropane, glycerin, pentaerythritol, diglycerin, dipentaerythritol, sorbitol, etc. These alcohols can be used singly, or at least two of them are usable in combination.

The nitrogen-containing alkyd resins to be used in this invention include those modified with fatty acids. The representative fatty acids to be used are vegetable oil fatty acids. The vegetable oils are drying to semidrying oils (at least about 100 in iodine value) and nondrying oils (less than 100 in iodine value). Examples of useful fatty acids are those of drying to semidrying oils such as safflower oil, linseed oil, soybean oil, sesame oil, poppy seed oil, perilla oil, hemp seed oil, grape seed oil, corn oil, tall oil, sunflower oil, cotton seed oil, walnut oil, tung oil, dehydrated castor oil, rice bran oil, etc. and those of nondrying oils such as coconut oil, etc. Each vegetable oil as above can also be used as a fatty acid component as it is. Of these examples, preferable are drying or semidrying vegetable oil fatty acids. These fatty acids are usable singly, or at least two of them can be used in combination.

In reacting the polybasic acid component with the polyhydric alcohol component for esterification, it is suitable to use the two components in the ratio of about 0.5 to about 1.2 moles, more preferably about 0.7 to about 1.0 mole, of the former per mole of the latter. The alkanolamine is used in an amount of about 0.5 to about 55% by weight, preferably about 0.5 to about 20% by weight, more preferably about 1 to about 10% by weight, based on the combined amount of the polybasic acid component and the polyhydric alcohol component and further the fatty acid, if used. In the preparation of the nitrogen-containing alkyd resins modified with fatty acids, the total amount (oil length) of such fatty acids to be used is 0 to about 60% by weight, preferably about 5 to about 60% by weight, more preferably about 10 to about 45% by weight, based on the combined amount of the materials used, i.e. the polybasic acid component, the polyhydric alcohol component, and the fatty acid.

The nitrogen-containing alkyd resin of the present invention can be prepared by reacting the polybasic acid component with the polyhydric alcohol component, with or without addition of the desired fatty acid, under the same conditions as employed for preparing usual alkyd resins. The reaction temperature is usually in the range of at about 150° to about 250° C. The reaction usually completes within about 1 to about 15 hours.

The thermosetting coating composition of the present invention can be in the form of an organic or aqueous solution or dispersion. The nitrogen-containing alkyd resin suitable for preparation of organic solution or dispersion has preferably a hydroxyl value of about 20 to about 200, more preferably to about 30 to about 150, and to an acid value of about 0.1 to about 30, while for use in the aqueous system, the resin is preferably adjusted to a hydroxyl value of about 20 to about 200, more preferably about 30 to about 150, and to an acid value of about 10 to about 200.

Of the nitrogen-containing alkyd resins useful for the present invention, those modified with a fatty acid, especially with a drying or semidrying vegetable oil fatty acid, are more improved than unmodified resins in pigment dispersibility, stability of pigment dispersion, adhesion, water resistance, etc. and therefore preferable.

The crosslinking agent (B) is used for curing the nitrogen-containing alkyd resin (A) into a three-dimentional reticular structure by crosslinking with baking. It is a compound having a functional group which undergoes a crosslinking reaction with the hydroxyl group of the alkyd resin, such as a hydroxyl group, alkyl ether group, isocyanate group or the like. Examples of useful crosslinking agents are an alkyl-etherized melamine resin, urea resin and benzoguanamine resin which are methylolated or modified with at least one of monohydric alcohols (with 1 to 5 carbon atoms) and compounds having a blocked isocyanate group. The compound having a blocked isocyanate group is an isocyanate compound having its isocyanate group blocked with a blocking agent. Examples of useful isocyanate compounds are tolylene diisocyanate, adduct of tolylene diisocyanate and trimethylolpropane, diphenylmethane diisocyanate, methylene diisocyanate, hexamethylene diisocyanate, adduct of hexamethylene diisocyanate and trimethylolpropane, xylylene diisocyanate, lysine diisocyanate, etc. Examples of useful blocking agents are phenol, thiourea, methanol, propanol, n-butanol, t-butanol, ethyl acetoacetate, dimethyl malonate, ε-caprolactam, etc.

The thermosetting coating composition of the present invention consists essentially of the nitrogen-containing alkyd resin (A) and the crosslinking agent (B). The composition comprises about 95 to about 60% by weight, preferably about 85 to about 70% by weight, of the nitrogen-containing alkyd resin (A) and about 5 to about 40% by weight, preferably about 15 to about 30% by weight, of the crosslinking agent (B), based on the combined amount of the two components (A) and (B).

The thermosetting coating composition of the present invention is a liquid composition comprising an organic solvent and/or water as its solvent or dispersing medium. The coating composition of the organic solvent type can be prepared by dissolving or dispersing the two components (A) and (B) in a usual organic solvent for coating compositions. Examples of useful organic solvent are hydrocarbons such as toluene, xylene, naphtha, mineral spirit, octane and cyclohexane, alcohols such as methanol, ethanol, butanol, cyclohexanol and heptanol, ethers such as dioxane, methyl cellosolve, butyl cellosolve, methyl carbitol and butyl carbitol, esters such as ethyl acetate, butyl acetate, methyl cellosolve acetate, cellosolve acetate and carbitol acetate, ketones such as methyl ethyl ketone, methyl isobutyl ketone, cyclohexanone and isophorone, etc. The aqueous coating composition can be prepared by neutralizing the nitrogen-containing alkyd resin with a basic substance and dissolving or dispersing the neutralized resin and the crosslinking agent in water (which may contain an organic solvent). Examples of useful basic substances are ammonia, amine compounds such as trimethylamine, triethylamine, monoethanolamine, diethanolamine, triethanolamine, dimethylethanolamine, diethylethanolamine and morpholine, hydroxides such as caustic soda and caustic potash, etc.

The present thermosetting coating composition may have further incorporated therein known coloring pigments, extender pigments, metallic pigments, antisagging agents, curing promoting agents, etc.

The present thermosetting coating composition can be applied by brush coating, flow coating, air or airless spray coating, electrostatic coating, dip coating, curtain flow coating, electrodeposition, etc. The concentration of nonvolatile components of the composition to be applied can be in a wide range of about 10 to about 70% by weight. Suitably, the coating has a thickness of about 15 to about 40 μ when cured. For curing, the coating is usually baked to a temperature of about 100° to about 200° C. for about 10 to about 40 minutes. The articles to be coated with the present composition are those made of metals, plastics, wood, glass and the like, and have a surface which may be untreated or treated in conventional manner or coated with a primer, intercoat or topcoat.

The present invention will be described in greater detail with reference to preparation examples for preparing nitrogen-containing alkyd resins for use in the invention, and to the following examples and comparison example. In these examples the parts and percentages are all by weight.

PREPARATION EXAMPLE 1

A mixture of 7.0 parts of ethylene glycol, 5.0 parts of diethanolamine, 18.4 parts of pentaerythritol, 16.6 parts of adipic acid, 23.6 parts of isophthalic acid, 17.9 parts of tall oil fatty acid and 3 parts of xylene was reacted in a nitrogen atmosphere with stirring at 160° to 230° C. for about 12 hours. Subsequently, 11.5 parts of phthalic anhydride was reacted with the reaction mixture to effect addition by half-esterification and obtain nitrogen-containing alkyd resin (A-1) for use in the present invention. The resin (A-1) was found to be 130 in hydroxyl value, 60 in acid value, 0.9 in the mole ratio of polybasic acid/polyhydric alcohol, 5% in alkanolamine content and 20% in fatty acid content (oil length).

PREPARATION EXAMPLE 2

A mixture of 25.5 parts of trimethylolpropane, 2.5 parts of triethanolamine, 30 parts of phthalic anhydride, 42 parts of linseed oil fatty acid and 3 parts of xylene was reacted in the same manner as in Preparation Example 1 to obtain nitrogen-containing alkyd resin (A-2) for use in this invention. The resin (A-2) was found to be 30 in hydroxyl value, 10 in acid value, 0.95 in the mole ratio of polybasic acid/polyhydric alcohol, 45% in fatty acid content (oil length) and 2.5% in alkanolamine content.

PREPARATION EXAMPLE 3

A mixture of 27.8 parts of neopentyl glycol, 10 parts of triethanolamine, 35 parts of phthalic anhydride, 27.2 parts of soybean oil fatty acid and 3 parts of xylene was reacted in the same manner as in Preparation Example 1 to prepare nitrogen-containing alkyd resin (A-3) for use in this invention. The resin (A-3) was found to be 100 in hydroxyl value, 3 in acid value, 0.71 in the mole ratio of polybasic acid/polyhydric alcohol, 30% in fatty acid content (oil length) and 10% in alkanolamine content.

EXAMPLE 1

The nitrogen-containing alkyd resin (A-1) prepared in Preparation Example 1 was neutralized with diethylaminoethanol in an equivalent ratio. To 100 parts (calculated as solids) of the neutralized resin (A-1) were added 25 parts (calculated as solids) of water-soluble, methanol-modifed melamine resin (brand name "Sumimal M-30W," product of Sumitomo Chemical Company, Limited, Japan), 125 parts of titanium white pigment (brand name "JR-600E," product of Teikoku Kako Co., Ltd., Japan), 50 parts of butyl cellosolve and water. The mixture was treated by a ball mill for dispersion to obtain a colored coating composition-1 having a nonvolatile content of 50%.

EXAMPLE 2

To 100 parts (calculated as solids) of the nitrogen-containing alkyd resin (A-2) prepared in Preparation Example 2 were added 30 parts (calculated as solids) of butoxymelamine resin (brand name "UVAN 20SE," product of Mitsui Toatsu Chemicals, Inc., Japan), 20 parts of precipitated barium sulfate, 20 parts of "Mapico Yellow XLO" (brand name, product of Titan Kogyo Kabushiki Kaisha, Japan) and solvents (butanol and xylene). The mixture was treated by a sand mill for dispersion to obtain a colored coating composition-2 having a non-volatile content of 45%.

EXAMPLE 3

To 100 parts (calculated as solids) of the nitrogen-containing alkyd resin (A-3) prepared in Preparation Example 3 were added 25 parts (calculated as solids) of "UVAN 20SE," 6.25 parts of "Carbon Black 600E" (brand name, product of Nagase & Company, Ltd., Japan) and solvents (isobutanol and xylene). The mixture was treated by a ball mill to effect dispersion and obtain a colored coating composition-3 having a nonvolatile content of 55%.

COMPARISON EXAMPLE 1

A mixture of 27.8 parts of neopentyl glycol, 9 parts of trimethylolpropane, 35 parts of phthalic anhydride, 27.2 parts of soybean oil fatty acid and 3 parts of xylene was reacted in the same manner as in Preparation Example 1 to obtain an alkyd resin for comparison.

A colored coating composition-4 was prepared in the same manner as in Example 3 except that the comparison alkyd resin was used in place of the resin (A-3) in Example 3.

Test Results

The colored coating compositions 1 to 4 prepared in the foregoing Examples and Comparison Example were applied to iron panels surface-treated with iron phosphate and then cured by baking. The coated panels were tested for various properties of coating. Table 1 shows the results.

TABLE 1

| Coating composition | Example 1 | Example 2 | Example 3 | Comp. Ex. 4 |
|---|---|---|---|---|
| Baking condition | 140° C., 30 min | 130° C., 30 min | 140° C., 30 min | 140° C., 30 min |
| Thickness of cured coating (μ) | 30 | 35 | 25 | 25 |
| Appearance (*1) | good | good | good | good |
| Gloss (60°) (*2) | 97 | 97 | 97 | 89 |
| Gloss (20°) (*2) | 86 | 85 | 84 | 78 |
| Corrosion resistance (*3) | 2 mm | 1 mm | 1.5 mm | 4.5 mm |
| Acid resistance (*4) | good | good | good | good |
| Alkali resistance (*5) | good | good | good | poor |
| Flexibility (*6) | good | good | good | poor |
| Pencil hardness (*7) | H | H | H | HB |
| Solvent resistance (*8) | good | good | good | good |
| Adhesion (*9) | 100/100 | 100/100 | 100/100 | 30/100 |
| Re-coating ability (*10) | 100/100 | 100/100 | 100/100 | 60/100 |
| Storage properties (*11) State | no change | no change | no change | sediment |
| Gloss (60°) | 96 | 96 | 96 | 69 |
| Gloss (20°) | 84 | 83 | 82 | 51 |

(*1) Appearance:
The coating surface was checked with the unaided eye for smoothness, cissing and pitting. The word good indicates that the surface had no faults.
(*2) Gloss:
Measured according to JIS K5400.
(*3) Corrosion resistance:
A cross cut reaching the substrate was formed in the coating on the panel, which was then exposed to a salt spray for 96 hours. An adhesive cellophane tape was adhered to the cut portion and then peeled off. The length (mm) of the coating peeled off on either side of the cut was measured.
(*4) Acid resistance:
Drops of N/10 aqueous solution of sulfuric acid were placed onto the coating on the panel as supported horizontally, the panel was then allowed to stand for 24 hours, and the coating surface was thereafter checked for changes. The word good indicates that the surface was free of any change.
(*5) Alkali resistance:
Determined by the same method as above (*4) except that the acid solution was replaced by N/10 aqueous solution of caustic soda. The word good indicates that the coating exhibited no change, and the word poor shows that the coating blushed or became dull.
(*6) Flexibility:
The coated panel was bent to a radius of curvature of 6 mm with the coating out, and the coating was then checked for changes. The word good shows that the coating was free from any change, while the word poor indicates that chipping or cracking occurred.
(*7) Pencil hardness:
Measured according to JIS K5400.
(*8) Solvent resistance:
The coated panel was immersed in toluene at 20° C. for 5 hours and then checked for changes. The word good shows that the coating was free from any change.
(*9) Adhesion:
The coated panel was immersed in water at 40° C. for 24 hours, then withdrawn and allowed to stand for 1 hour. Subsequently, the coating was cut crosswise to the surface of the substrate with a razor to form 100 squares, 1 mm × 1 mm. An adhesive cellophane tape was adhered to the coating surface and then peeled off. The number of remaining squares was counted.
(*10) Re-coating ability:
An iron panel surface-treated with iron phosphate was coated with the colored coating composition to a thickness of 20μ when cured, baked at 180° C. for 30 minutes, then further coated with the same composition to a thickness of 20μ whenhen cured, baked at 120° C. for 30 minutes, and thereafter checked for adhesion in the same manner as above (*9).
(*11) Storage properties:
The colored coating composition was stored at 40° C. for 20 days and checked for the resulting change, i.e. sedimentation of the pigment. The words no change show that the composition exhibited no change, while the word sediment shows that apparent sedimentation of pigment occurred. The gloss was measured by the same manner as above (*2).

We claim:

1. In a thermosetting alkyd resin coating composition consisting essentially of (A) an alkyd resin or a fatty acid-modified alkyd resin obtained by reacting a polybasic acid component with a polyhydric alcohol component using or without using a fatty acid conjointly with the components and (B) a crosslinking agent, the composition which is characterized in that the polyhydric alcohol component comprises an alkanolamine having at least two hydroxyl groups in the molecule.

2. A coating composition as defined in claim 1 wherein the alkanolamine having at least two hydroxyl groups is at least one selected from the group consisting of diethanolamine, triethanolamine, diisopropanolamine, triisopropanolamine, methyldiethanolamine, cyclohexyldiisopropanolamine and methyldiisopropanolamine.

3. A coating composition as defined in claim 2 wherein the alkanolamine having at least two hydroxyl groups is at least one of diethanolamine and triethanolamine.

4. A coating composition as defined in claim 1 wherein the ratio of the polybasic acid component to the polyhydric alcohol component is about 0.5 to about 1.2 moles of the former per mole of the latter.

5. A coating composition as defined in claim 4 wherein the ratio of the polybasic acid component to the polyhydric alcohol component is about 0.7 to about 1.0 mole of the former per mole of the latter.

6. A coating composition as defined in claim 1 wherein the alkanolamine having at least two hydroxyl groups is used in an amount of about 0.5 to about 55% by weight based on the combined amount of the polybasic acid component and the polyhydric alcohol component and further including the fatty acid, if used.

7. A coating composition as defined in claim 6 wherein the alkanolamine having at least two hydroxyl groups is used in an amount of about 0.5 to about 20% by weight.

8. A coating composition as defined in claim 7 wherei the alkanolamine having at least two hydroxyl groups is used in an amount of about 1 to about 10% by weight.

* * * * *